(12) United States Patent
Tsuji et al.

(10) Patent No.: US 6,789,015 B2
(45) Date of Patent: Sep. 7, 2004

(54) VEHICLE ENVIRONMENT MONITORING SYSTEM

(75) Inventors: Takayuki Tsuji, Saitama (JP); Hiroshi Hattori, Saitama (JP); Nobuharu Nagaoka, Saitama (JP); Masahito Watanabe, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/102,572

(22) Filed: Mar. 20, 2002

(65) Prior Publication Data

US 2002/0183929 A1 Dec. 5, 2002

(30) Foreign Application Priority Data

Mar. 30, 2001 (JP) .................................... 2001-099285

(51) Int. Cl.[7] .......................... G05D 1/00; G06F 7/00; G06F 17/00
(52) U.S. Cl. ...................... 701/301; 701/96; 180/170; 340/435; 340/436
(58) Field of Search ............................ 701/301, 96, 93, 701/36; 180/170; 340/425.5, 435, 436

(56) References Cited

U.S. PATENT DOCUMENTS

| | | | | |
|---|---|---|---|---|
| 5,447,363 A | * | 9/1995 | Fukamachi | 303/125 |
| 5,577,569 A | * | 11/1996 | Nakashima | 180/169 |
| 5,839,534 A | * | 11/1998 | Chakraborty et al. | 180/169 |
| 6,076,622 A | * | 6/2000 | Chakraborty et al. | 180/169 |
| 6,122,597 A | * | 9/2000 | Saneyoshi et al. | 701/301 |
| 6,385,529 B1 | * | 5/2002 | Minowa et al. | 701/96 |

FOREIGN PATENT DOCUMENTS

JP   2001-006096   1/2001

OTHER PUBLICATIONS

2003/0139865–Prakah–Asante et al Jul. 24, 2003–method for robust occupant position control prior to vehicle impact.*

* cited by examiner

Primary Examiner—Thomas G. Black
Assistant Examiner—Olga Hernandez
(74) Attorney, Agent, or Firm—Carrier, Blackman & Associates, P.C.; Joseph P. Carrier; William D. Blackman

(57) ABSTRACT

A vehicle environment monitoring system for an automotive vehicle, is capable of accurately detecting the movement of an object existing in an external environment of the vehicle, and determining the probability of collision between the object and the vehicle, thereby appropriately warning the driver. A running speed of the vehicle is detected, and a distance between the object and the vehicle is calculated, based on the image obtained by the imaging device. A relative speed between the object and the vehicle is calculated according to the calculated distance. It is determined whether or not there is a significant probability that the vehicle may collide with the object, based on the running speed of the vehicle and the distance therebetween on condition that the relative speed is in the vicinity of the running speed of the vehicle.

24 Claims, 13 Drawing Sheets

*FIG. 4*
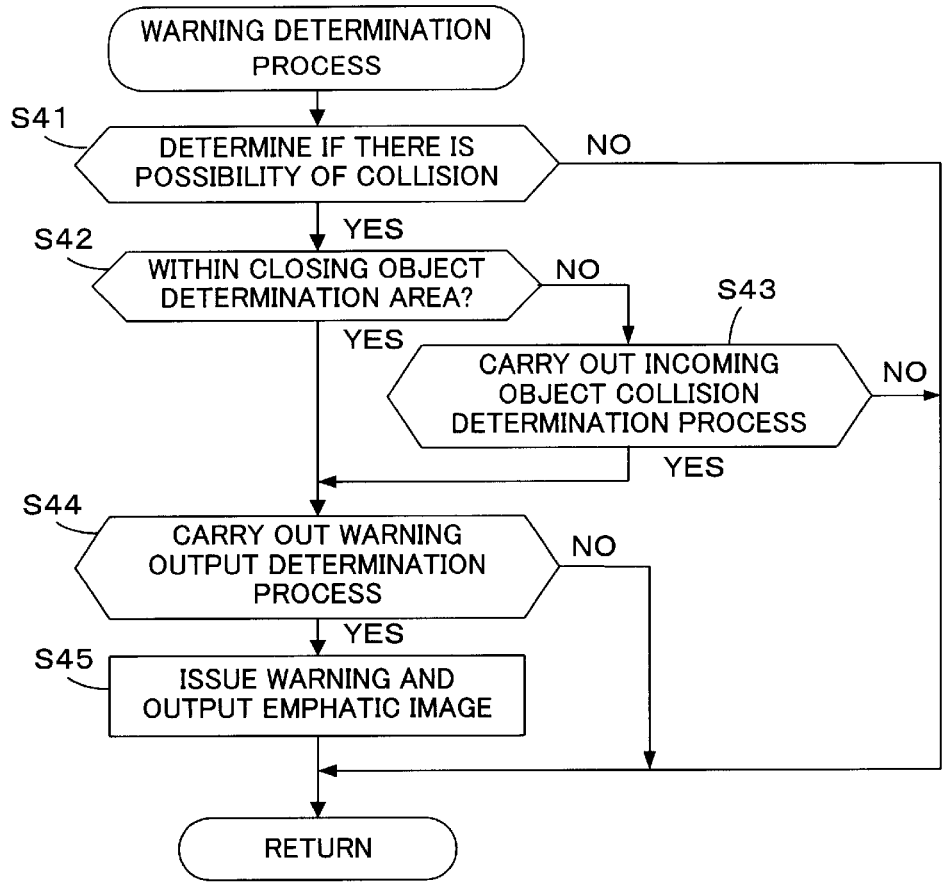
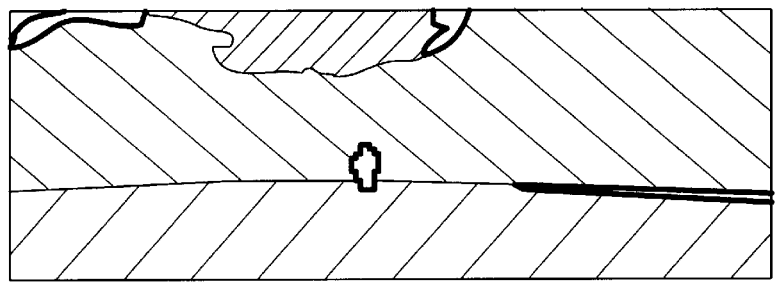
*FIG. 5A*
RIGHT IMAGE
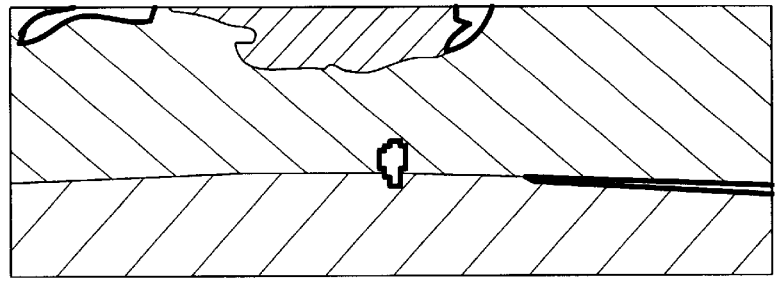
*FIG. 5B*
LEFT IMAGE

FIG. 6
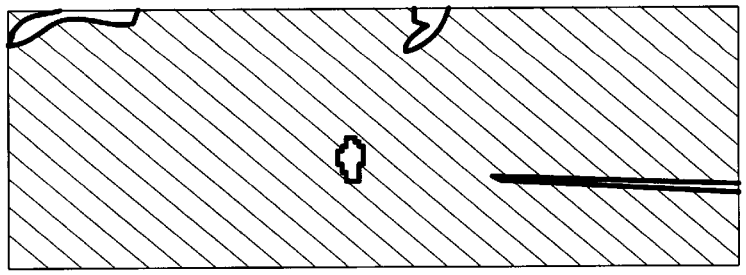
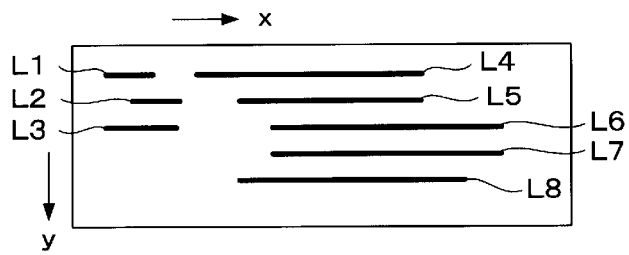
L1: (x3, y3, 2)
L2: (x4, y4, 2)
L3: (x3, y5, 3)
L4: (x7, y3, 8)
L5: (x8, y4, 7)
L6: (x9, y5, 8)
L7: (x9, y6, 8)
L8: (x8, y7, 8)
FIG. 7A
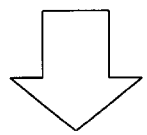
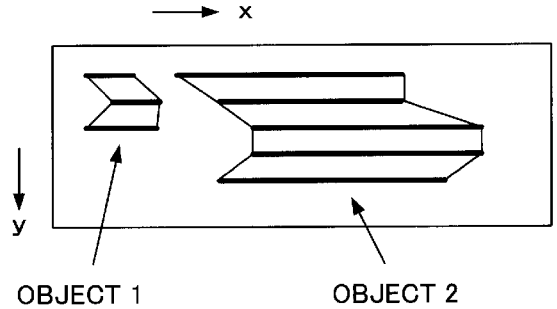
L1: (x3, y3, 2, 1)
L2: (x4, y4, 2, 1)
L3: (x3, y5, 3, 1)
L4: (x7, y3, 8, 2)
L5: (x8, y4, 7, 2)
L6: (x9, y5, 8, 2)
L7: (x9, y6, 8, 2)
L8: (x8, y7, 8, 2)
FIG. 7B
OBJECT 1    OBJECT 2
OBJECT LABEL
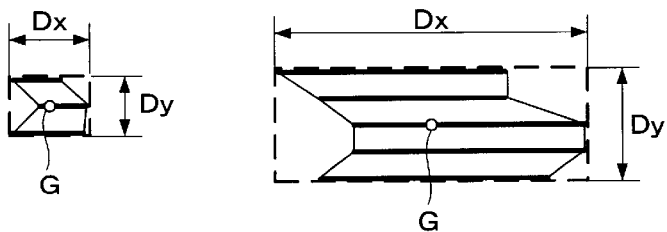
FIG. 7C TIME k TIME (k+1)

RIGHT IMAGE

LEFT IMAGE

RIGHT IMAGE

LEFT IMAGE

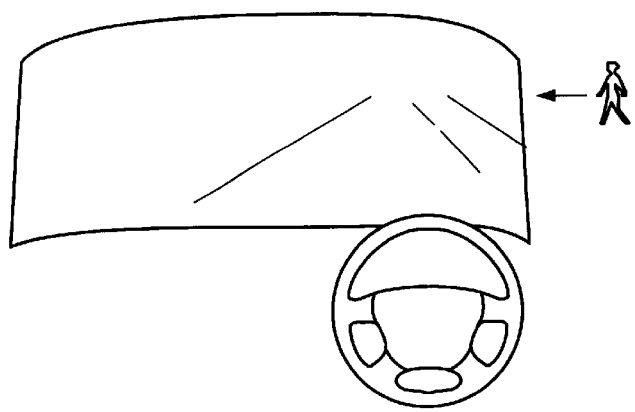
FIG. 21A
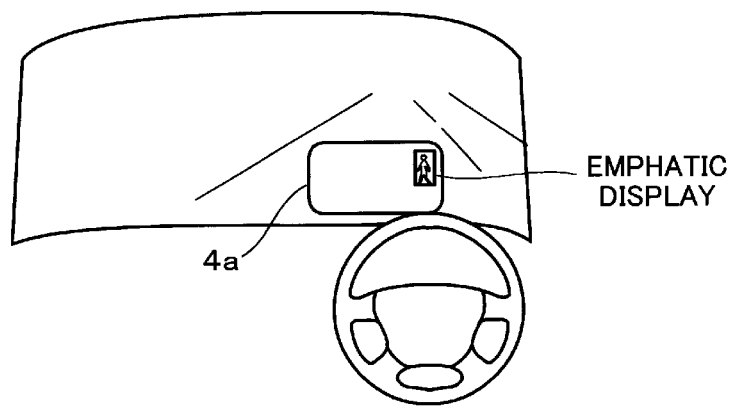
FIG. 21B
FIG. 22
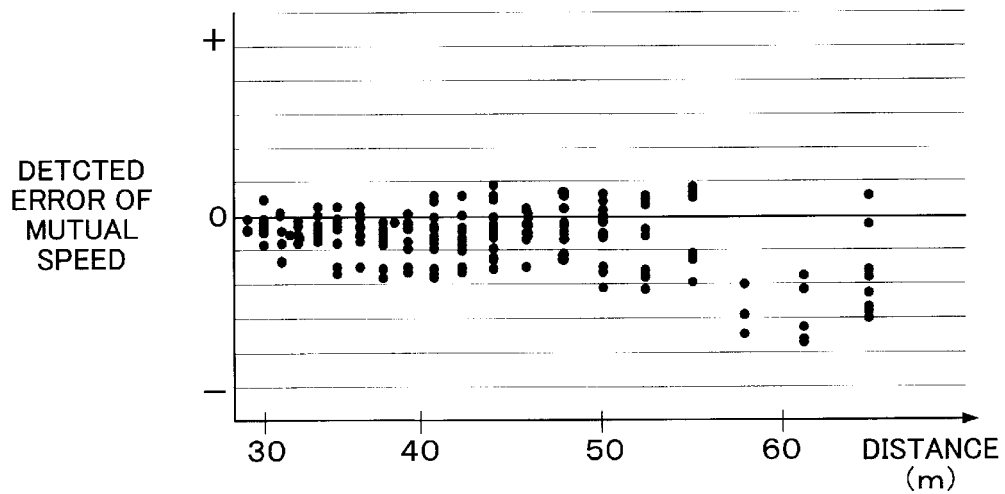

VEHICLE ENVIRONMENT MONITORING SYSTEM

BACKGROUND OF THE INVENTION

1. Field of the Invention

The present invention relates to a vehicle environment monitoring system that monitors an external environment of a vehicle on which the system is installed. The system detects an external object, which may collide with the vehicle from an image obtained by an imaging device mounted on the vehicle. The system hereof assists a user in avoiding a potential collision against a large animal, such as a deer, a bear or the like, since such collision has an adverse influence on the vehicle.

2. Description of the Prior Art

Conventionally, a warning device for giving a warning when the distance between the vehicle and an object approaching the vehicle becomes short was proposed by Japanese Laid-Open Patent Publication No. 2001-6096. The device detects a distance between the vehicle and the object based on the displacement between images of the object, that is, the parallax of images obtained by two cameras mounted on the vehicle. According to this device, the change rate of the detected distance is calculated as a relative speed, and a time period TY until the estimated time the vehicle may collide with the object (an estimated allowance time period TY) is calculated based on the relative speed and the distance. Further, a warning is given when the estimated allowance time period TY is shorter than a predetermined allowance time period T.

FIG. 22 is a diagram showing actually detected data of an error of the relative speed detected by the method shown in the above publication. As is clear from FIG. 22, the error of the detected relative speed increases as the distance from the object increases. Therefore, calculating the estimated allowance time period TY based on the relative speed and the distance raises a problem that the warning may be given too early or too late.

For example, if the detected relative speed is 60 km/h at a distance of 60 meters, the estimated allowance time period TY is 3.6 seconds (=(60/60000)×3600). Accordingly, if the predetermined time period T is set to 4 seconds, a warning is given. However, if the relative speed is erroneously detected as 40 km/h at the distance of 60 meters, the estimated allowance time period TY becomes 5.4 seconds (=(60/40000)×3600). Then a warning is not given although the probability that the collision may occur after 3.6 seconds is high. Even in this case, a warning is given after a little while, since the accuracy of detecting the distance becomes higher as the distance decreases. That is, the timing of giving a warning is delayed. In contrast, if the relative speed is erroneously detected as higher than the actual speed, the timing of giving a warning becomes too early.

Further, the above-described conventional method causes another problem that the vehicle running in the opposite lane and approaching at a comparatively high speed, or the vehicle running ahead in the same lane may be detected as an object with high possibility of collision, which often causes unnecessary warnings.

SUMMARY OF THE INVENTION

It is an object of the invention to provide a vehicle environment monitoring system, which is capable of more accurately determining the probability of collision between the object and the vehicle, thereby giving a waning to the driver at a desired timing, and preventing unnecessary warnings.

To attain the above object, the present invention provides a vehicle environment monitoring system, which detects an object existing in an external environment of the vehicle from an image, obtained by imaging means mounted on the automotive vehicle. The vehicle environment monitoring system includes vehicle speed detecting means, distance calculating means, relative speed calculating means, and probability determining means. The vehicle speed detecting means detects a running speed of the vehicle. The distance calculating means calculates a distance between the object and the vehicle, based on the image obtained by the imaging means. The relative speed calculating means calculates a relative speed between the object and the vehicle, according to the distance calculated by the distance calculating means. The probability determining means determines whether or not there is a substantial probability that the vehicle may collide with the object, based on the running speed of the vehicle and the distance calculated by the distance calculating means. A warning alarm is generated, provided on condition that the relative speed between the object and the vehicle is in the vicinity of the running speed of the vehicle.

According to this vehicle environment monitoring system, it is determined whether or not there is a significant probability that the vehicle may collide with the object, based on the running speed of the vehicle instead of the relative speed, and the distance between the vehicle and the object. This probability is determined on condition that the relative speed is in the vicinity of the running speed of the vehicle, in other word, the sensed object is moving at a relatively low speed, or standing still. Therefore, it is possible to issue a warning at a desired timing, even if the detection error of the relative speed is relatively large. Further, since the determination is carried out on condition that the relative speed is in the vicinity of the vehicle speed, it is possible to substantially prevent unnecessary warnings when the vehicle is approaching another vehicle that is running in the opposite lane, or running ahead in the same lane.

Preferably, the determining means carries out the determination, when an absolute value of a difference between the relative speed and the running speed of the vehicle is less than or equal to half of the running speed of the vehicle.

Preferably, the vehicle environment monitoring system further includes relative position-detecting means and movement vector-calculating means. The relative position-detecting means detects a relative position of the object to the vehicle, based on the image obtained by the imaging means and the distance calculated by the distance calculating means, to thereby obtain position data. The movement vector-calculating means calculates positions of the object in a real space, based on a plurality of time series items of the position data detected on the object by the relative position-detecting means, and calculates a movement vector of the object based on the positions in the real space. The probability determining means determines whether or not the probability of collision is high based on the movement vector, when it is determined based on the running speed of the vehicle and the distance that there is a possibility of collision.

According to this configuration, an accuracy of the determination is improved by using the movement vector.

Preferably, the movement vector-calculating means includes approximate straight line-calculating means for calculating an approximate straight line approximating a locus of relative movement of the object, and position data-correcting means for correcting the time series items of the position data by using the approximate straight line. The movement vector-calculating means calculates the movement vector based on the corrected time series items of the position data.

According to this configuration, a detection error relating to position data is reduced, to make it possible to more accurately determine the probability of collision.

Preferably, the probability determining means carries out the determination by applying collision determination conditions that are dependent on a width of the vehicle.

According to this configuration, the probability of collision is more accurately determined and unnecessarily alarms are prevented.

More preferably, the approximate straight line-calculating means calculates the approximate straight line as a three-dimensional straight line including data of a height of the object.

According to this configuration, it is possible to accurately determine the probability of collision, even when the vehicle is running on a hilly road.

Preferably, the imaging means comprises two infrared cameras capable of detecting infrared rays.

According to this configuration, an animal, a running automotive vehicle, or the like can easily be detected, even when the driver is driving at night and it is difficult to recognize them.

Preferably, the imaging means comprises two TV cameras for detecting infrared rays or visible rays, and the relative position-detecting means includes search area-setting means and corresponding object image-identifying means. The search area-setting means sets, based on a position of an object image contained in an image output from one of the two TV cameras, a search area within an image output from the other of the two TV cameras, for searching for a corresponding object image contained in the image output from the other TV camera. The corresponding object image-identifying means identifies the corresponding object image by carrying out a correlation operation on data within the search area. The distance-calculating means calculates the distance between the vehicle and the object, based on a parallax between the first object image and the corresponding object image.

Preferably, the vehicle environment monitoring system includes warning means for warning a driver, when it is determined by the determining means that there is a high probability of collision against the object. The warning means is preferably inhibited from warning the driver when the driver is carrying out a braking operation, and at the same time, deceleration caused by the braking operation is larger than a predetermined threshold.

According to this configuration, the driver is not warned when he has already recognized the object and is carrying out an appropriate braking operation. This makes it possible to substantially prevent the driver from being annoyed by an unnecessary warning.

The above and other objects, features, and advantages of the invention will become more apparent from the following detailed description taken in conjunction with the accompanying drawings.

BRIEF DESCRIPTION OF THE DRAWINGS

FIG. 4 is a flowchart showing details of a warning determination process in FIG. 3;

FIGS. 5A and 5B are diagrams each showing halftone portions as hatched areas, which are useful in explaining gray scale images obtained by infrared cameras, in which:

FIG. 5A shows a right image obtained by a right one of the infrared cameras;

FIG. 5B shows a left image obtained by a left one of the same;

FIG. 6 is a diagram showing a black area as a hatched one, which is useful in explaining an image formed by binarization of a gray scale image;

FIGS. 7A to 7C are diagrams which are useful in explaining a process for converting binarized image data to run length data and labeling of objects for identification thereof;

FIG. 21A shows a state where a screen of a head up display is not displayed;

FIG. 21B shows a state where a screen of the head up display is displayed; and

FIG. 22 is a diagram for explaining a problem associated with the conventional technique.

DETAILED DESCRIPTION

The invention will now be described in detail with reference to drawings showing an embodiment thereof.

Figure 1:
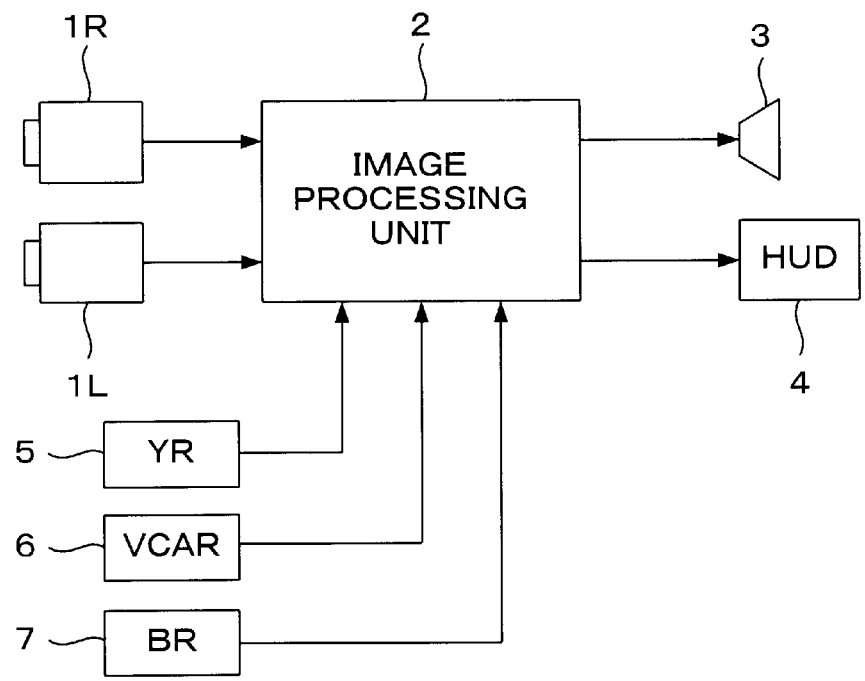
FIG. 1 is a block diagram showing the arrangement of a vehicle external environment monitoring system according to an illustrative embodiment of the invention.

Referring first to FIG. 1, there is shown the arrangement of a vehicle environment monitoring system, according to an illustrative embodiment of the invention. The system depicted in FIG. 1 includes right and left infrared cameras 1R, 1L capable of detecting far-infrared rays, a yaw rate sensor 5 for detecting yaw rate of the vehicle, a vehicle speed sensor 6 for detecting traveling speed (vehicle speed) VCAR of the vehicle, a brake sensor 7 for detecting an operation amount of a brake (not shown), and an image-processing unit 2 for detecting an object, such as an animal or the like, ahead of the vehicle. Objects are detected based on image data obtained by the above cameras 1R, 1L. The system also includes a speaker 3 for generating a voice alarm for warning the driver, and a head up display (hereinafter referred to as the "HUD") 4 for displaying an image obtained by the camera 1R or 1L. The HUD 4 permits the driver to recognize the object having the high probability of collision against the vehicle.

Figure 2:
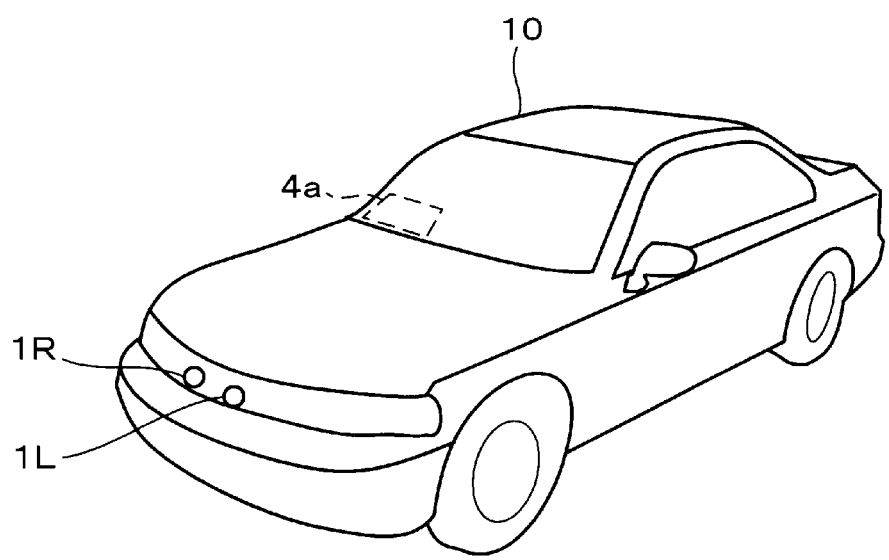
FIG. 2 is a diagram illustrating portions of a vehicle at which mounting cameras appearing in FIG. 1 are mounted.

As shown in FIG. 2, the cameras 1R, 1L are arranged in a front portion of the automotive vehicle 10 at locations symmetric with respect to the longitudinal central axis of the vehicle 10. The cameras are rigidly fixed to the vehicle such that the two cameras 1R, 1L have optical axes in parallel with each other and disposed at equal heights from a road surface. The infrared cameras 1R, 1L have a characteristic that the output signal level thereof becomes higher (the luminance of an image of an object increases) as the temperature of the object becomes higher.

The image-processing unit 2 includes an A/D converter circuit for converting input analog signals to digital signals, an image memory for storing digitized image signals, a CPU (Central Processing Unit) for carrying out arithmetic operations, a RAM (Random Access Memory) used by the CPU for storing data being processed in the arithmetic operations, a ROM (Read Only Memory) storing programs executed by the CPU, tables, and maps, and an output circuit for outputting driving signals to the speaker 3, display signals to the HUD 4, and the like. Output signals from the cameras 1R, 1L and the sensors 5 to 7 are converted to digital signals and input to the CPU.

As shown in FIG. 2, the HUD 4 is arranged such that a screen 4a thereof is displayed in a front window at a location ahead of the driver.

Figure 3:
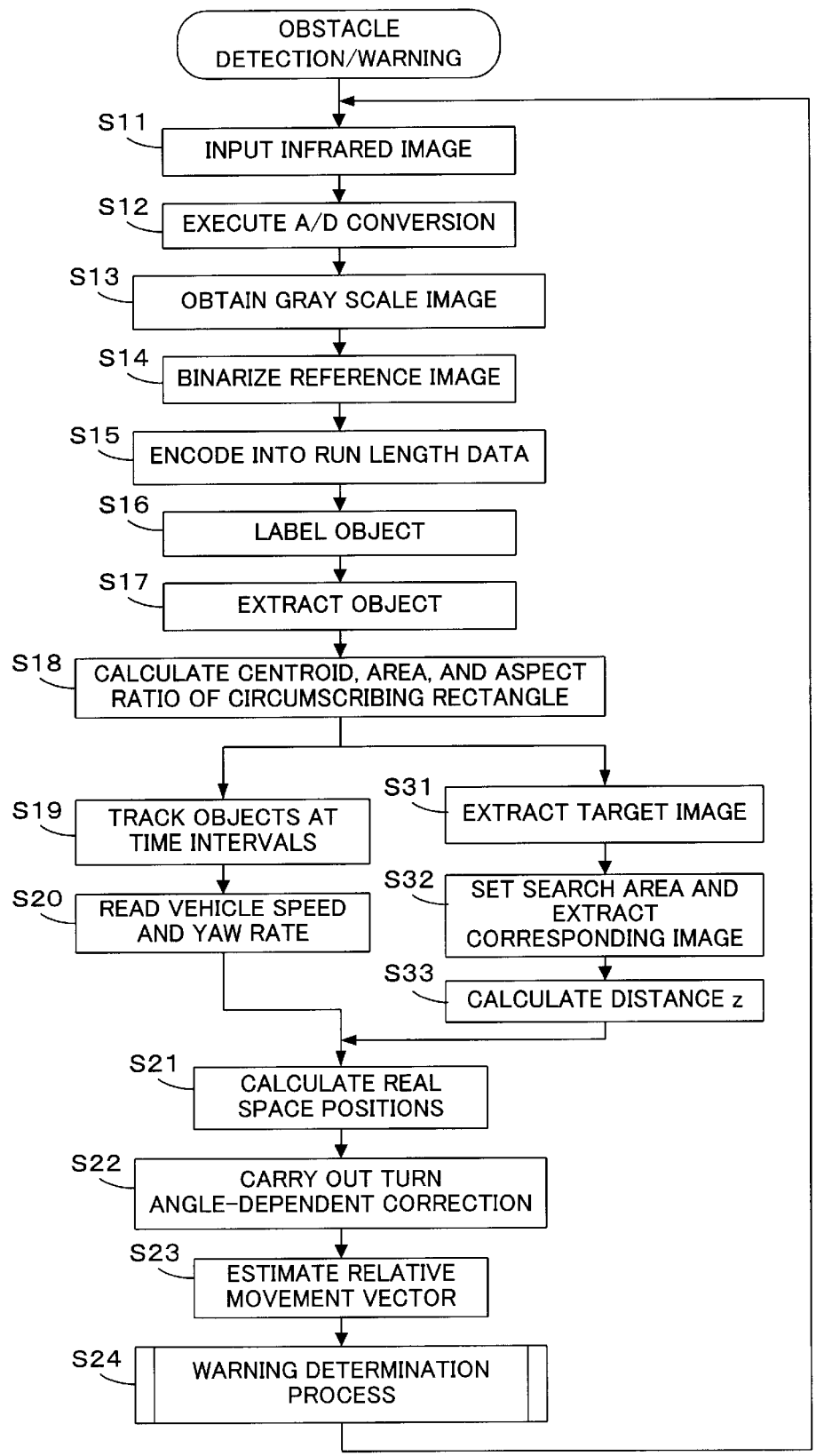
FIG. 3 is a flowchart showing a procedure of processing steps executed by an image-processing unit appearing in FIG. 1.

FIG. 3 is a flowchart showing a procedure of processing steps executed by the image-processing unit 2. First, output signals from the cameras 1R, 1L are subjected to A/D conversion by the A/D converter circuit and the resulting digital data are stored in the image memory (steps S11, S12, S13). Data of images stored in the image memory is data of gray scale images including luminance information. FIGS. 5A and 5B are diagrams for explaining gray scale images obtained by the respective cameras 1R, 1L (a right image by the camera 1R, and a left image by the camera 1L). Hatched areas in the right and left images are halftone (gray) areas, while areas surrounded by thick solid lines are areas at a high luminance level (at a high temperature). The areas surrounded by thick, solid lines are areas (hereinafter referred to as "high luminance areas") of detected objects, displayed in white on the screen. In the right image and the left image, an identical object is displayed as dual, respective images at respective locations horizontally displaced from each other, so that it is possible to calculate a distance from the vehicle 10 to the object, based on the image displacement (parallax).

At step S14 in FIG. 3, the right image is set to a reference image, and the digital image data representative of the reference image is binarized (converted to 1-bit data) such that an area at a level of luminance equal to or higher than a luminance threshold ITH, experimentally determined, is set to "1" (white) and an area at a lower level of luminance than the threshold ITH is set to "0" (black). FIG. 6 shows an image obtained by binarization of the FIG. 5A image. In the figure, a hatched area represents a black area, while areas surrounded by thick solid lines (high luminance areas) represent respective white areas.

At the following step S15, the binarized image data is encoded into run length data. FIG. 7A is a diagram for explaining the encoding process. In the figure, areas set to white by the above binarization are represented by lines L1 to L8 indicative of respective lines of pixels. Although the lines L1 to L8 each have a width of one pixel in the y direction, and are actually arranged side by side without any gaps in the y direction, they are shown as separate lines spaced from each other for clarity of description. Further, the lines L1 to L8 have respective lengths of two pixels, two pixels, three pixels, eight pixels, seven pixels, eight pixels, eight pixels, and eight pixels in the x direction. The run length data represents each of the lines L1 to L8 by the coordinates of the starting point (point of the left end) of the line and the length (the number of pixels) of the line from the starting point to the ending point (point of the right end) of the same. For instance, the line L3 is formed of three pixels (x3, y5), (x4, y5) and (x5, y5), and represented by the run length data (x3, y5, 3).

At steps S16 and S17, an object is extracted by labeling the same, as shown in FIG. 7B. That is, out of the lines L1 to L8 encoded into the run length data, the lines L1 to L3 overlapping in the y direction are regarded as one object 1, and the lines L4 to L8 overlapping in the y direction are regarded as one object 2, whereby object labels 1 and 2 are added to the run length data. This processing enables, e.g, the high luminance areas appearing in FIG. 6, to be grasped as objects 1 to 4, respectively.

At step S18, as shown in FIG. 7C, the centroid G of an extracted object (image of an object), the area S of the extracted object, and the aspect ratio ASPECT of a rectangle circumscribing the extracted object (indicated in FIG. 7C by broken lines) are calculated. The area S is calculated by integrating the lengths of the run length data of an identical object. The coordinates of the centroid G is calculated as the x coordinate of a line equally dividing the area S along the y direction into halves, and the y coordinate of a line equally dividing the area S along the x direction into halves. The aspect ratio ASPECT is calculated as Dy/Dx which is a ratio of Dy to Dx appearing in FIG. 7C. It should be noted that the position of the centroid of the circumscribing rectangle may be used in place of that of the centroid G of the extracted object.

Figure 8A:
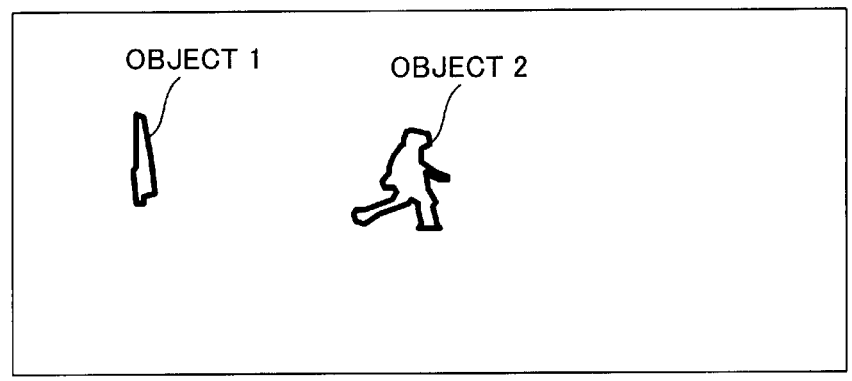
FIGS. 8A and 8B are diagrams useful in explaining how objects are tracked at time intervals.

At step S19, objects are tracked at time intervals, that is, identification or recognition of identical objects is carried out whenever each sampling repetition period elapses. Assuming that a time obtained by discretizing time t as an analog amount by a sampling repetition period is represented by k, objects 1 and 2 extracted at time k, as shown in FIG. 8A, and objects 3 and 4 extracted at time (k+1) as shown in FIG. 8A are checked as to their identity. More specifically, it is determined that the objects 3 and 4 are identical with the respective objects 1 and 2 when the following identification conditions (1) to (3) are satisfied, and the objects 3 and 4 are labeled as objects 1 and 2 to thereby track the objects at time intervals:

(1) Assuming that the position coordinates of the centroid of objects i (=1, 2) in an image at time k are represented by (xi(k), yi(k)), and the position coordinates of the centroid of objects j (=3, 4) in an image at time (k+1) are represented by (xj(k+1), yj(k+1)), the following conditions are satisfied:

|xj(k+1)−xi(k)|<Δx, and

|yj(k+1)−yi(k)|<Δy wherein Δx and Δy represent maximum allowable values for respective distances covered by the object moving in the image in the x direction and the y direction.

(2) Assuming that the areas of the objects i (=1, 2) in the image at time k are represented by Si(k), and the areas of the objects j (=3, 4) in the image at time (k+1) are represented by Sj(k+1), the following condition is satisfied:

Sj(k+1)/Si(k)<1±ΔS wherein ΔS represents a maximum allowable value for a change in the area.

(3) Assuming that the aspect ratios of rectangles circumscribing the objects i (=1, 2) at time k are represented by ASPECT i(k), and the aspect ratios of rectangles circumscribing the objects j (=3, 4) at time (k+1) are represented by ASPECT j(k+1), the following condition is satisfied:

ASPECT j(k+1)/ASPECT i(k)<1±ΔASPECT wherein ΔASPECT represents a maximum allowable value for a change in the aspect ratio.

Figure 8B:
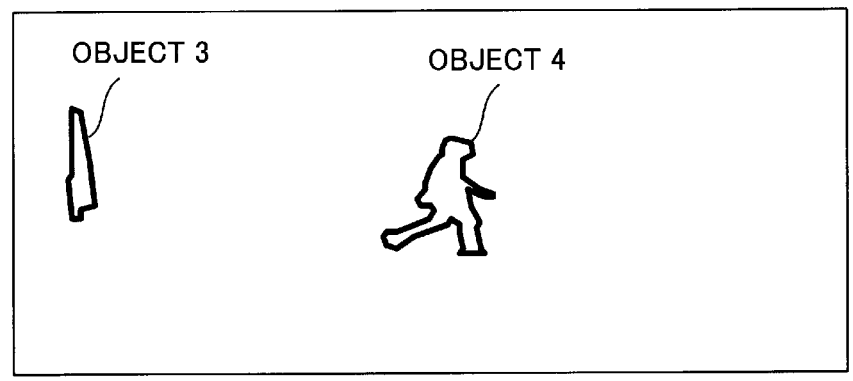

When comparison is made between FIG. 8A and FIG. 8B, the size of each object is increased in FIG. 8B, but the objects 1 and 3 satisfy the above identification conditions, and the objects 2 and 4 satisfy the above identification conditions. Hence, the objects 3 and 4 can be identified with the respective objects 1 and 2. The position coordinates (of the centroid) of each object thus identified are stored in the memory as time series items of position data, and used for carrying out subsequent arithmetic operations.

It should be noted that the above-mentioned processes at steps S14 to S19 are executed on the binarized reference image (the right image in the present embodiment).

At step S20 in FIG. 3, the vehicle speed VCAR detected by the vehicle speed sensor 6 and the yaw rate YR detected by the yaw rate sensor 5 are read in for integration of the yaw rate YR over time, whereby the angle θ r of turn of the automotive vehicle 10 (see FIG. 14) is calculated.

On the other hand, at steps S31 to S33, an operation for calculating a distance z between the object and the automotive vehicle 10 is carried out in parallel with the processes at steps S19 and 20. This arithmetic operation takes a longer time period than the processes at steps S19 and 20, and hence it is executed at a longer repetition period than that of the processes at steps S19 and 20 (approximately three times as long as a repetition period of execution of the processes from step S11 to step S20).

Figure 9A:
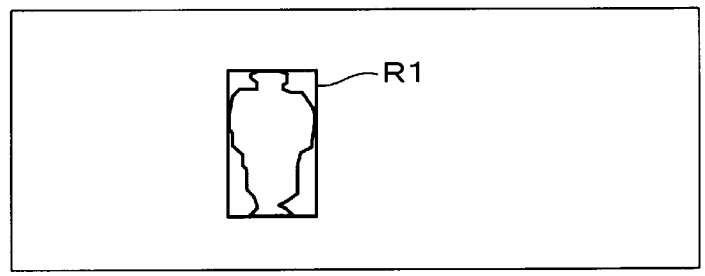
FIG. 9A is a diagram useful in explaining a target image in the right image.
Figure 9B:
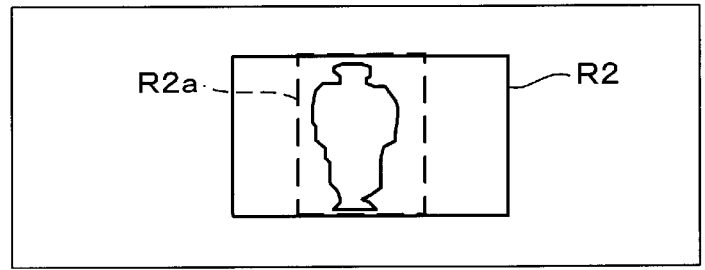
FIG. 9B is a diagram useful in explaining a search area set in the left image.

At step S31, one of objects tracked by using the binarized image of the reference image (right image) is selected, whereby as shown in FIG. 9A, a target image R1 (whole area surrounded by a circumscribing rectangle is set to a target image in this example) is extracted from the right image. At the following step S32, a search area for searching an image (hereinafter referred to as the "corresponding image") corresponding to the target image is set within the left image, and the corresponding image is extracted by performing a correlation operation. More specifically, as shown in FIG. 9B, a search area R2 is set in the left image based on the coordinates of each vertex of the target image R1, and the total sum value C (a, b) of luminance differences indicative of a degree of correlation with the target image R1 is calculated as to data within the search area R2 by using the following equation (1), whereby an area which provides the minimum value of the total sum value C (a, b) is extracted as the corresponding image.

Figure 10A:
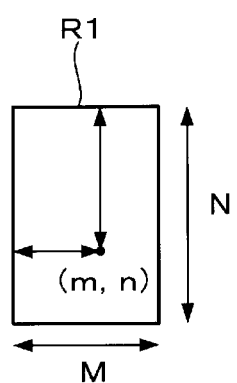
FIGS. 10A and 10B are diagrams useful in explaining a correlation operation carried out on data within the search area.
Figure 10B:
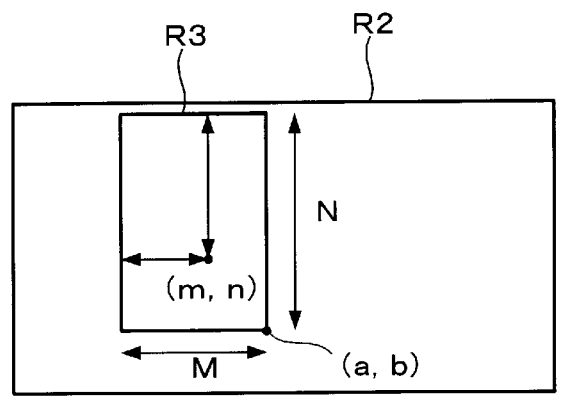

It should be noted that the correlation operation is carried out not by using data of binarized images (binary data) but by using data of gray scale images (gray scale data). Further, when position data of an identical object obtained in the past is available, an area R2a (shown by broken lines in FIG. 9B) narrower than the search area R2 is set to the search area based on the position data.

$$C(a, b) = \sum_{n=0}^{N-1} \sum_{m=0}^{M-1} |IL(a+m-M, b+n-N) - IR(m, n)| \quad (1)$$

wherein IR (m, n) represents a luminance value of a position shown by coordinates (m, n) in the target image R1 appearing in FIG. 10A, and IL(a+m−M, b+n−N) represents a luminance value of a position shown by coordinates (m, n) in a local area R3 having the same shape as that of the target image R1 with a reference point (origin of its own coordinate system) set to coordinate (a, b) in the search area R2 as indicated in FIG. 10B. A position minimizing the total sum value C (a, b) of the luminance differences is obtained by changing the coordinates (a, b) of the reference point, whereby the position of the corresponding image can be determined.

Figure 11A:
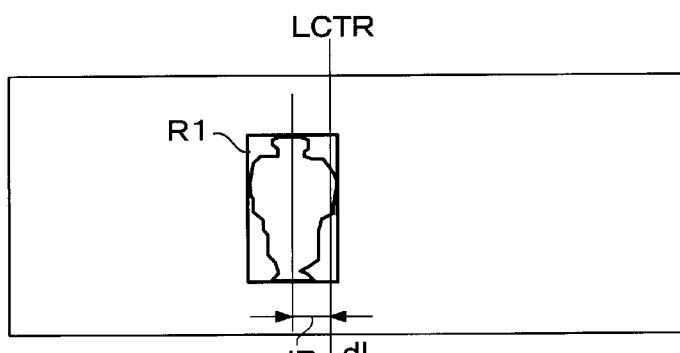
FIGS. 11A and 11B are diagrams useful in explaining a method of calculating a parallax.
Figure 11B:
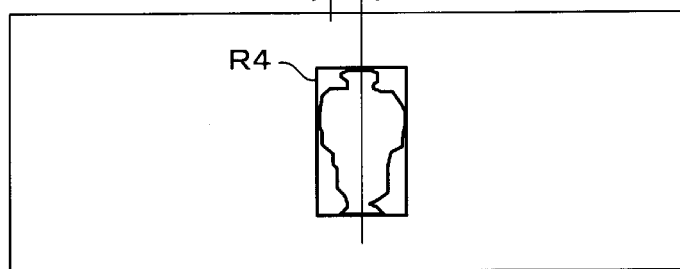
Figure 12:
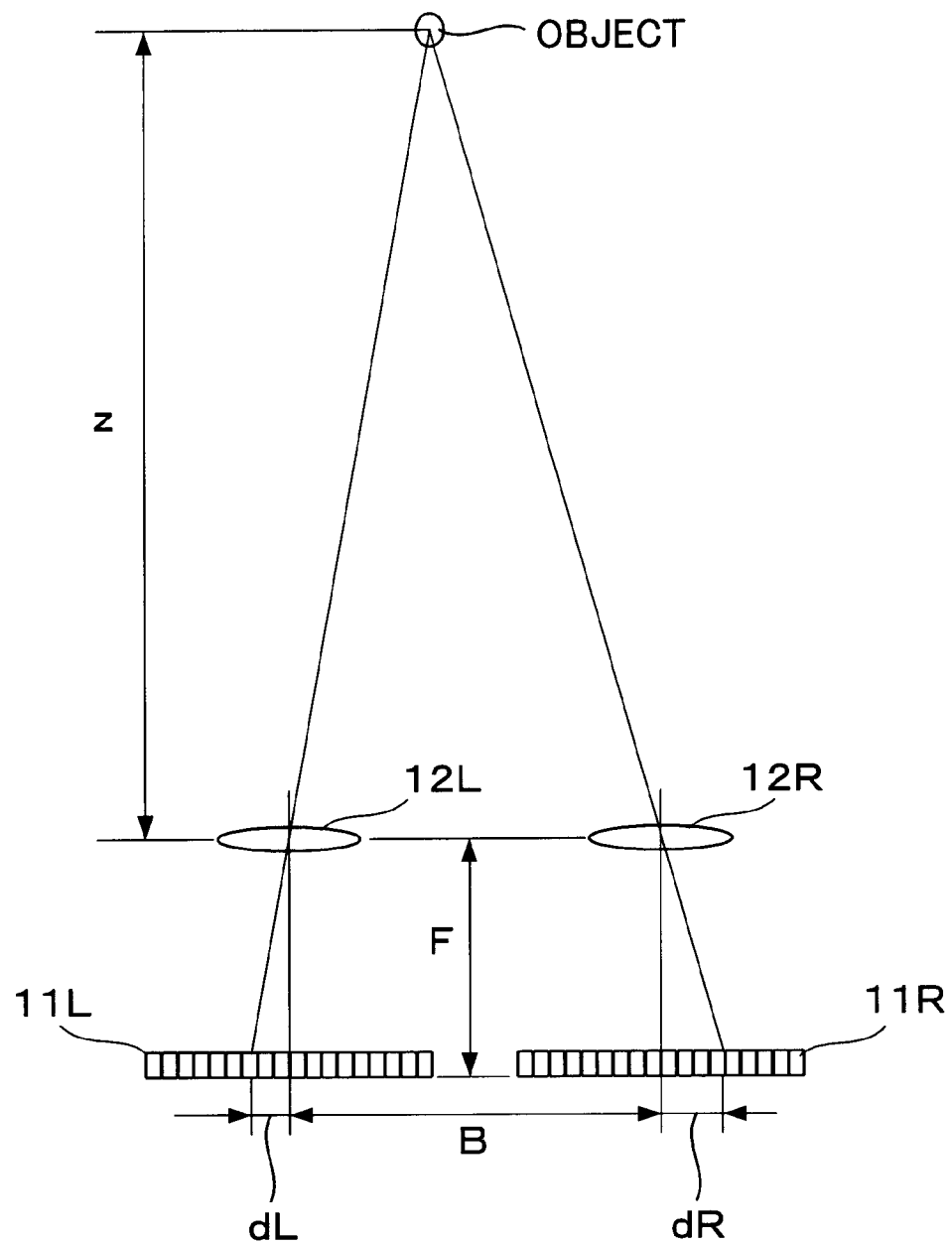
FIG. 12 is a diagram useful in explaining a method of calculating a distance between the vehicle and the object based on the parallax.

After the target image R1 and the corresponding image R4 corresponding to this target image R1 as shown in FIGS. 11A and 11B are extracted at step S32, then at step S33, a distance dR (the number of pixels) between the centroid of the target image R1 and a center line LCTR of the right image, and a distance dL (the number of pixels) between the centroid of the corresponding image R4 and a center line LCTR of the left image are determined, and applied to the following equation (2) to calculate a distance z between the automotive vehicle 10 and the object.

$$z = \frac{B \times F}{(dL + dR) \times p} = \frac{B \times F}{\Delta d \times p} \quad (2)$$

wherein B designates the length of a baseline, that is, a horizontal distance (in the x direction) between the center position of an imaging element 11R of the camera 1R and the center position of an imaging element 11L of the camera 1L (i.e. distance between the optical axes of the respective cameras), as shown in FIG. 12; F designates the focal distance of lenses 12R, 12L; p designates a space interval between pixels in the imaging elements 11R, 11L; and Δd (=dR+dL) represents the amount of parallax.

Figure 13A:
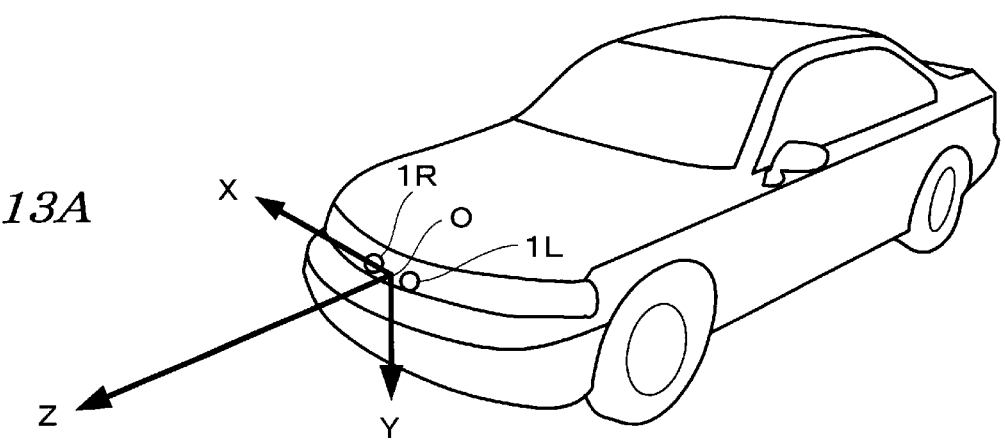
FIGS. 13A and 13B are diagrams useful for explaining a coordinate system used in the present embodiment.
Figure 13B:
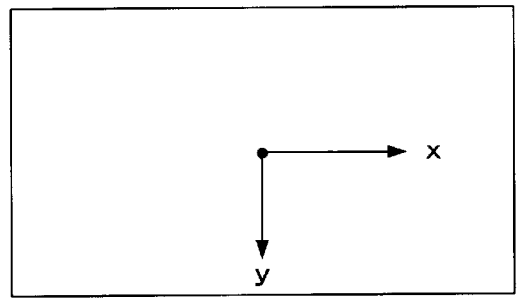

At step S21, coordinates (x, y) in the image and the distance z calculated by using the equation (2) are applied to the following equations (3) for conversion to real space coordinates (X, Y, Z). Here, the coordinate system of the real space coordinates (X, Y, Z) (real space coordinate system) is defined as shown in FIG. 13A with the position of a mid point (position fixed on the automotive vehicle 10) of mounting positions at which the cameras 1R, 1L are mounted being set to an origin O of the real space coordinate system, and coordinates in a coordinate system of an image (imaginary image, referred to hereinafter) corresponding to the real coordinate system is defined as shown in FIG. 13B, with the center of the image being set to the origin of the coordinate system corresponding to the real space coordinate system, the horizontal direction being defined as the x direction, and the vertical direction being defined as the y direction.

$$\begin{bmatrix} X \\ Y \\ Z \end{bmatrix} = \begin{bmatrix} xc \times z/f \\ yc \times z/f \\ z \end{bmatrix} \quad (3)$$

$$f = F/p$$

In these equations, (xc, yc) are obtained by converting the coordinates (x, y) in the coordinate system of the right image to coordinates in the coordinate system of the imaginary image, the center of which is caused to coincide with the origin O of the real space coordinate system, based on the relative relationship of the mounting position of the camera 1R and the origin O of the real space coordinate system. Further, f represents a ratio between the focal distance F and the pixel-to-pixel space interval p.

Figure 14:
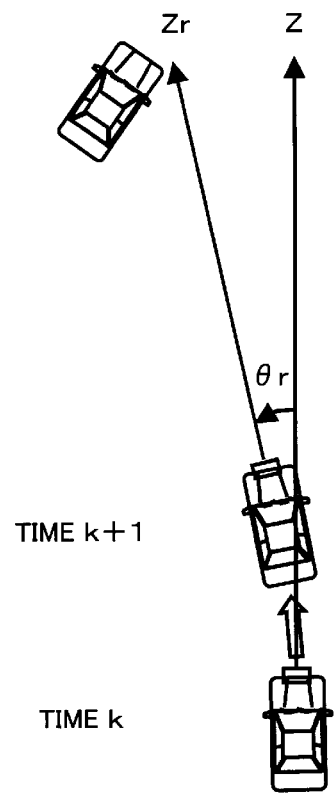
FIG. 14 is a diagram useful in explaining a turn angle-dependent correction of position data of an object.
Figure 15:
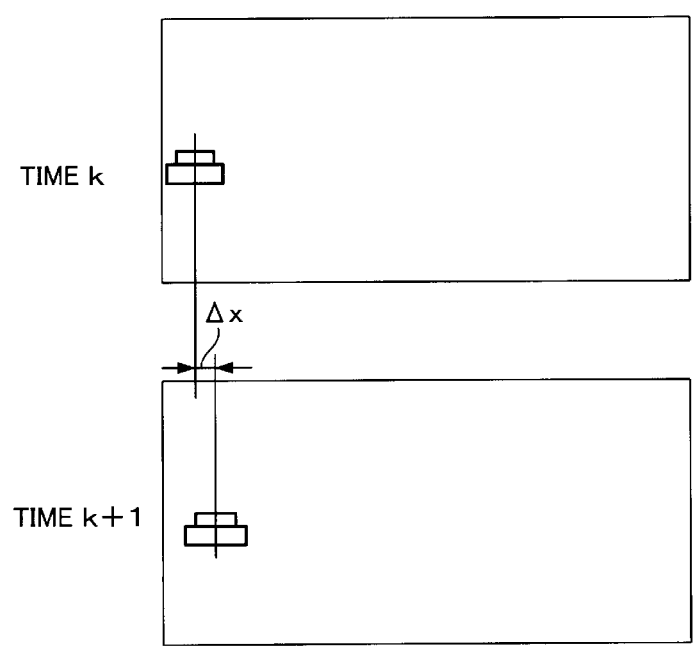
FIG. 15 is a diagram showing the displacement of the object in the images due to turning of the vehicle.

At step S22, a turn angle-dependent correction of position data of each object is carried out by compensating for positional displacement of the object in the image due to turning of the vehicle 10, according to the angle of turn. Assuming that the vehicle 10 makes a turn, as shown in FIG. 14, e.g. in a leftward direction through an angle θr of turn during a time period from a time k to a time (k+1), an image obtained by the camera is displaced by Δx in the x direction, as shown in FIG. 15. The turn angle-dependent correction at step S22 is carried out to compensate for the displacement of the image. More specifically, the real space coordinates (X, Y, Z) are applied to the following equation (4) to calculate corrected coordinates (Xr, Yr, Zr). Real space position data (Xr, Yr, Zr) thus calculated is stored in the memory in a manner correlated to each corresponding object. Further, in the following description, the corrected coordinates are denoted as coordinates (X, Y, Z).

$$\begin{bmatrix} Xr \\ Yr \\ Zr \end{bmatrix} = \begin{bmatrix} \cos\theta r & 0 & -\sin\theta r \\ 0 & 1 & 0 \\ \sin\theta r & 0 & \cos\theta r \end{bmatrix} \begin{bmatrix} X \\ Y \\ Z \end{bmatrix} \quad (4)$$

Figure 16:
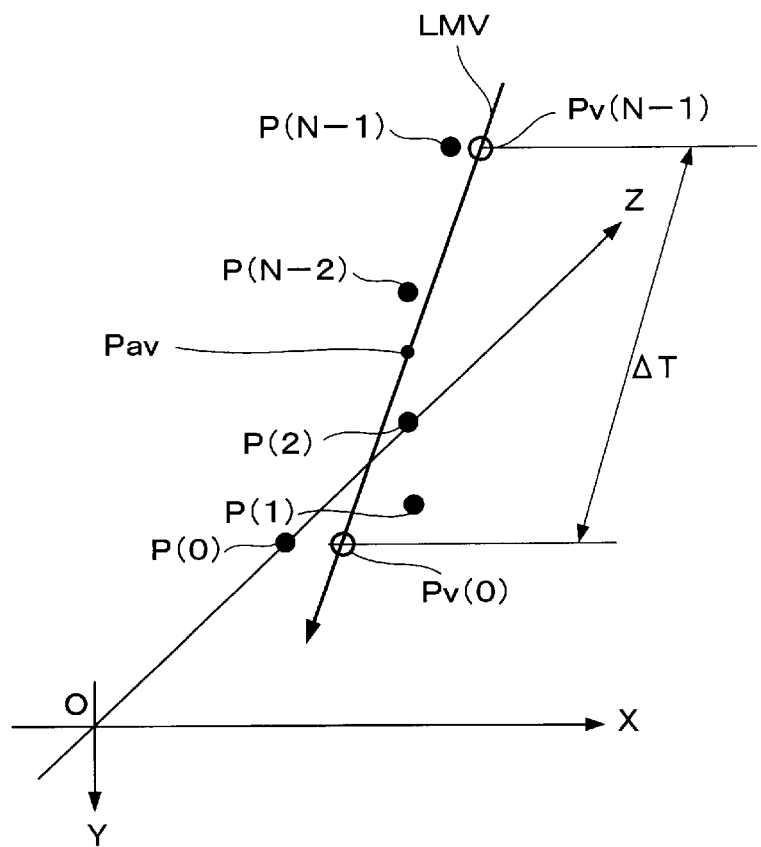
FIG. 16 is a diagram useful in explaining a method of calculating a relative movement vector.

At step S23, as shown in FIG. 16, an approximate straight line LMV corresponding to a relative movement vector between an identical object and the automotive vehicle 10 is obtained based on N real space position data items, i.e. time series position data (N is a number equal to or close to 10, for instance) after the turn angle-dependent correction, which were obtained during a time period ΔT. More specifically, assuming that a direction vector indicative of the direction of the approximate straight line LMV is represented by L=(lx, ly, lz) (|L|=1), a straight line represented by the following equations (5) is determined:

$$X = u \cdot lx + Xav \quad (5)$$
$$Y = u \cdot ly + Yav$$
$$Z = u \cdot lz + Zav$$
$$Xav = \sum_{j=0}^{N-1} X(j)/N$$

$$Yav = \sum_{j=0}^{N-1} Y(j)/N$$

$$Zav = \sum_{j=0}^{N-1} Z(j)/N$$

wherein u represents a parameter capable of having an arbitrary value, and Xav, Yav and Zav represent the average value of X coordinates, the average value of Y coordinates, and the average value of Z coordinates, respectively, of series of real space position data. Further, if the parameter u is eliminated from the equations (5), the following equation (5a) is obtained:

$$(X-Xav)/lx=(Y-Yav)/ly=(Z-Zav)/lz \quad (5a)$$

FIG. 16 is a diagram illustrating the approximate straight line LMV. In the figure, P(0), P(1), P(2), . . . , P(N–2), P(N–1) designate points indicated by respective time series position data items (data points) after the turn angle-dependent correction. The approximate straight line LMV is determined as a straight line which extends through the average position coordinates Pav (=Xav, Yav, Zav) of the time series position data item, and minimizes an average value of the squares of respective distances between the line and the data points. Here, a numeric value in parentheses added to each P indicating the coordinates of each data point (position coordinates) shows that the larger the numeric value is, the older the data item having the numeric value is. For instance, P(0) indicates the latest position coordinates, P(1) indicates position coordinates obtained one sampling repetition period earlier, and P(2) indicates position coordinates obtained two sampling repetition periods earlier. The same applies to D(j), X(j), Y(j), Z(j) and the like referred to hereinafter.

More specifically, inner products s of vector D(j)=(DX(j), DY(j), DZ(j))=(X(j)–Xav, Y(j)–Yav, Z(j)–Zav) which extend from the average position coordinates Pav to the coordinates P(0) to P(N–1) of the respective data points and a direction vector L are calculated by the following equation (6), and the direction vector L=(lx, ly, lz) maximizing the variance of the inner products s is determined.

$$s=lx \cdot DX(j)+ly \cdot DY(j)+lz \cdot DZ(j) \quad (6)$$

A variance-covariance matrix V of the coordinates at the respective data points is represented by the following equation (7). Since a characteristic value σ for this variance-covariance matrix V corresponds to the variance of the inner products s, a characteristic vector corresponding to the largest one of three characteristic values calculated from the matrix becomes the direction vector L desired to be obtained. It should be noted that in order to calculate characteristic values and a characteristic vector from the matrix of the equation (7), a method known as Jacobian method (described e.g. in "Suuchi-Keisan Handbook (Handbook of Numeral Calculus)" (published by Ohmsha, Ltd, Tokyo, Japan)) is used.

$$V = \frac{1}{N-1} \begin{bmatrix} \sum_{j=0}^{N-1} DX(j)^2 & \sum_{j=0}^{N-1} DX(j) \cdot DY(j) & \sum_{j=0}^{N-1} DX(j) \cdot DZ(j) \\ \sum_{j=0}^{N-1} DX(j) \cdot DY(j) & \sum_{j=0}^{N-1} DY(j)^2 & \sum_{j=0}^{N-1} DY(j) \cdot DZ(j) \\ \sum_{j=0}^{N-1} DX(j) \cdot DZ(j) & \sum_{j=0}^{N-1} DY(j) \cdot DZ(j) & \sum_{j=0}^{N-1} DZ(j)^2 \end{bmatrix} \quad (7)$$

Next, the latest position coordinates P(0)=(X(0), Y(0), Z(0)), and the position coordinates P(N−1)=(X(N−1), Y(N−1), Z(N−1)) obtained (N−1) sampling repetition periods (time period ΔT) earlier are corrected such that positions thereof are on the approximate straight line LMV. More specifically, by applying the Z coordinates, Z(0), Z(N−1) to the above-mentioned equation (5a), that is, by using the following equations (8), corrected position coordinates Pv(0)=(Xv(0), Yv(0), Zv(0)) and corrected position coordinates Pv(N−1)=Xv(N−1), Yv(N−1), Zv(N−1) are calculated.

$$Xv(j) = (Z(j) - Zav) \times \frac{lx}{lz} - Xav \quad (8)$$

$$Yv(j) = (Z(j) - Zav) \times \frac{ly}{lz} - Yav$$

$$Zv(j) = Z(j)$$

$$j = 0, N - 1$$

As the vector extending from the position coordinates Pv(N−1) to the position coordinates Pv(0) calculated by the equations (8), the aforementioned relative movement vector can be obtained. As described above, an approximate straight line approximating the locus of relative movement of an object to the automotive vehicle 10 is calculated, based on a plurality of (N) data items of position data during a monitoring time period ΔT, and a relative movement vector is determined, based on the approximate straight line. This makes it possible to reduce adverse influence of position detection errors, and more accurately estimate the probability of collision against the object in advance.

Now, referring again to FIG. 3, at step S24, a warning determination process (FIG. 4) is carried out by determining whether or not there is a possibility of collision against the detected object, and issuing a warning if the probability of the collision is high.

At step S41 in FIG. 4, a relative speed Vs in the Z direction is calculated by the following equation (9). When the following expressions (10a), (10b), and (11) are satisfied, it is determined that there is a significant probability of collision, and the program proceeds to step S42. If any one or more of the expressions (10a), (10b), and (11) is/are not satisfied, the warning determination process is terminated.

$$Vs = (Zv(N-1) - Zv(0))/\Delta T \quad (9)$$

$$VCAR/2 \leq Vs \leq VCAR \times 3/2 \quad (10a)$$

$$(|VCAR - Vs| \leq VCAR/2) Zv(0)/VCAR \leq T \quad (10b)$$

$$|Yv(0)| \leq H \quad (11)$$

In the above expressions, Zv(0) represents the latest detected distance value (although v is added to the symbol to indicate that the symbol represents a value of a data item corrected by using the approximate straight line LMV, the Z coordinate itself has the same value as it has before the correction), and Zv(N−1) represents a distance value detected a time period ΔT earlier. Further, T represents a lead time provided so as to enable determining the possibility of collision a time period T earlier than an estimated collision time. T is set to a time period within a range of e.g. two to five seconds. Further, H represents a predetermined height for defining a range in the Y direction, that is, in the direction of height, which is set to e.g. a height approximately two times as large as that of the automotive vehicle 10.

The expression (10a) is satisfied when the relative speed is in the vicinity of the vehicle speed VCAR or is at least a predetermined percentage of the running speed of the vehicle, in other words, the object is moving at a relatively low speed, or standing still.

Figure 17:
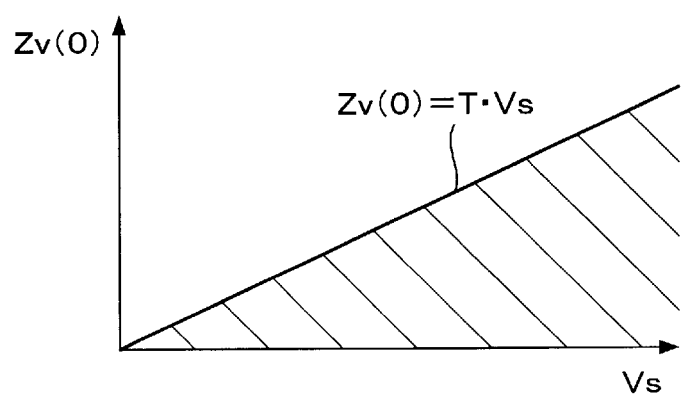
FIG. 17 is a diagram useful in explaining conditions for determining whether or not a warning should be issued.

The relationship implied in the expression (10b) can be shown by FIG. 17. When all of the following conditions are satisfied, determination processes at step 42 et seq. are carried out:

1) the expression (10a) is satisfied, i.e., the relative speed Vs is in the vicinity of the vehicle speed VCAR;
2) the expression (10b) is satisfied, i.e., coordinates corresponding to the relative speed Vs and the distance Zv(0) both detected or calculated are within an hatched area in FIG. 17; and
3) the expression (11) is satisfied, i.e., |Yv(0)| is less than or equal to H.

A significant probability of collision is determined on condition that the expressions (10a) and (10b) are satisfied, and the warning is issued according to the position and the relative movement vector of the object. Therefore, even if a detection error of the relative speed is comparatively large, the probability of collision is accurately determined, and the warning can be issued at a desired timing. Further, other vehicles that are running in the opposite lane, or running ahead in the same lane, are excluded from the objects of warning, by the condition of the expression (10a). Accordingly, frequent unnecessary warnings can be substantially prevented.

Figure 18:
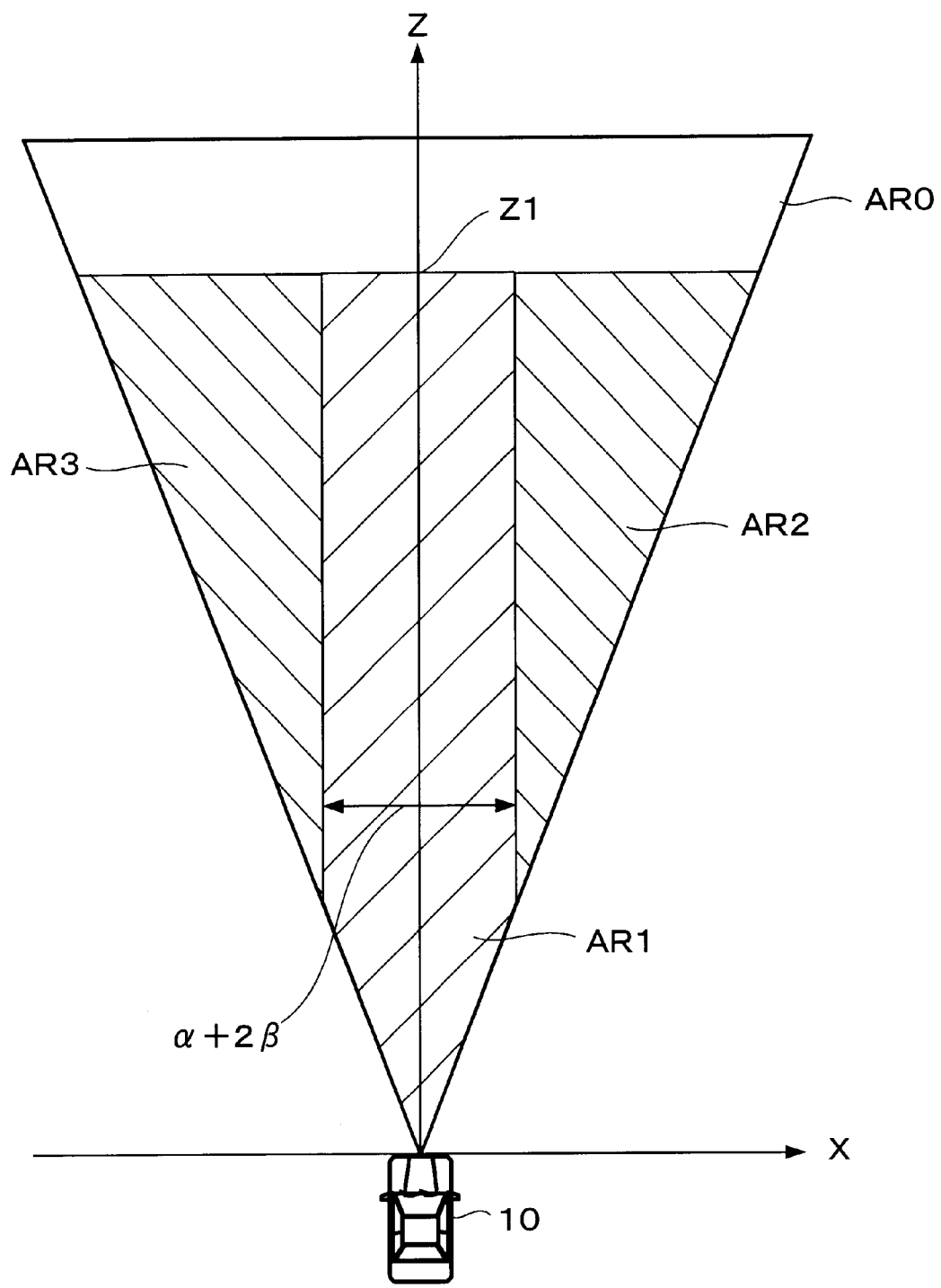
FIG. 18 is a diagram useful in explaining divisional areas in front of the vehicle.

In FIG. 18, an area which can be monitored by the cameras 1R, 1L is shown by an area AR0 defined by an outer triangle indicated by thick solid lines. In the area AR0, areas AR1, AR2, and AR3 which are closer to the automotive vehicle 10 than Z1=Vs×T (vehicle speed×lead time) are set to warning determination areas. Here, the area AR1 is an area corresponding to a range including the width α of the automotive vehicle 10 and allowances β, β (each having a value of e.g. 50 to 100 cm) provided on opposite sides of the vehicle 10, in other words, an area having a width of (α/2+β) on each side of the central axis in the longitudinal direction of the vehicle 10. If the object continues to exist in this area, there is a very high probability of collision against the vehicle 10. Hence, hereinafter, this area is referred to as the "closing object determination area". The areas AR2, AR3 are areas having X coordinates with larger absolute values than those of X coordinates in the closing object determination area (areas laterally outward of the closing object determination area). An object in one of these areas AR2 and AR3 is subjected to an incoming object collision determination process described hereinafter, for determining the possibility of potential collision of an incoming object. These areas AR2 and AR3 are referred to as the "incoming object determination areas". Further, the above areas have the predetermined height H in the Y direction, as shown in the expression (11).

The answer to the question of step S41 becomes affirmative (Yes) when the object exists in the closing object determination area AR1 or in one of the incoming object determination areas AR2, AR3.

At the following step S42, it is determined whether or not the object exists in the closing object determination area AR1. If the answer to the question of step S42 is affirmative (Yes), the program immediately proceeds to step S44, whereas if the answer is negative (No), the incoming object collision determination process for determining the possibility of potential collision of the incoming object is carried out at step S43. More specifically, it is determined whether or not the following expression (12) is satisfied by the difference between the latest x coordinate xc(0) (as described above, c is added to the symbol to indicate that the symbol represents the x coordinate corrected by causing the center position of the image to coincide with the origin O of the real space coordinate system) and an x coordinate xc(N−1) obtained a time period ΔT earlier. If the following expression (12) is satisfied, it is determined that there is a high probability of collision.

$$\frac{-\alpha \cdot f}{2}\left(\frac{1}{Zv(0)} - \frac{1}{Zv(N-1)}\right) \leq \qquad (12)$$
$$xc(0) - xc(N-1) \leq \frac{\alpha \cdot f}{2}\left(\frac{1}{Zv(0)} - \frac{1}{Zv(N-1)}\right)$$

Figure 19:
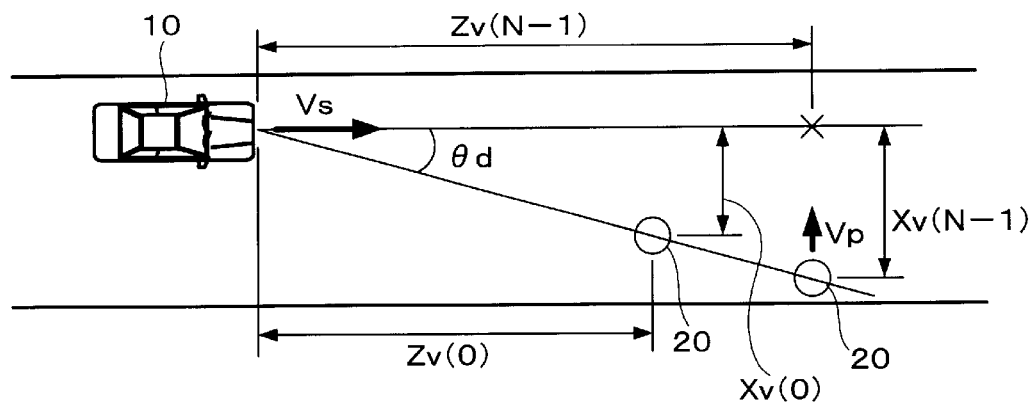
FIG. 19 is a diagram useful in explaining a case in which a collision is liable to occur.
Figure 20:
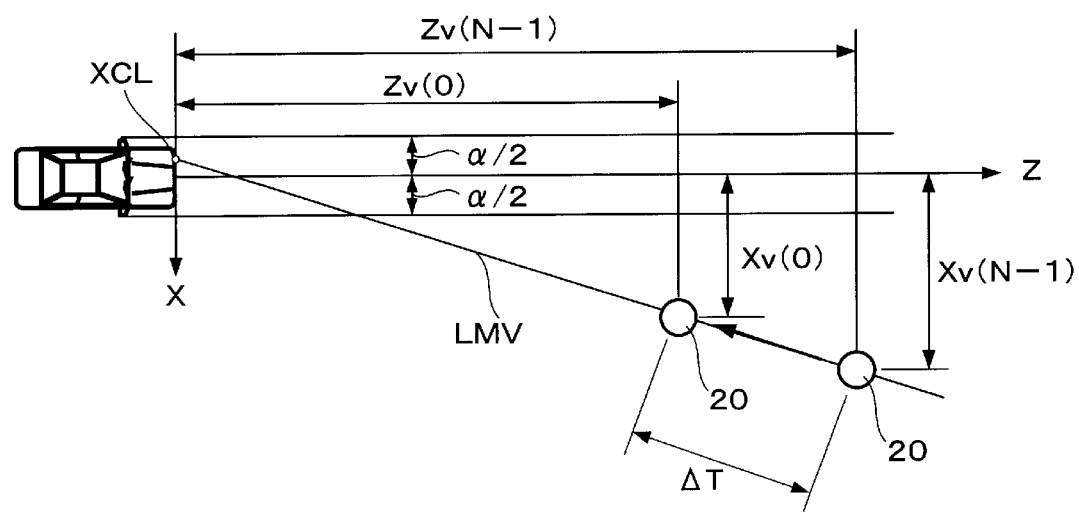
FIG. 20 is a diagram useful in explaining a method of incoming object collision determination dependent on a width of the vehicle.

As shown in FIG. 19, if an animal 20 comes in a direction approximately orthogonal to the direction of running of the automotive vehicle 10, when Xv(N−1)/Zv(N−1)=Xv(0)/Zr(0) holds, in other words, when a ratio Vp/Vs=Xr(N−1)/Zr(N−1) holds (Vp is a speed of the animal 20 and Vs is a relative speed of the vehicle 10), an azimuthal angle θd of the animal 20 as viewed from the vehicle 10 is constant. In this case, there is a high probability of collision. The expression (12) is used for determining the probability by taking the width α of the automotive vehicle 10 into account. In the following, a method of deriving the expression (12) will be described with reference to FIG. 20.

When a straight line extending through the latest position coordinates of the object 20 and the position coordinates thereof obtained a time period ΔT earlier, that is, the approximate straight line LMV, intersects an X-Y plane (plane including the X axis and the Y axis, i.e. a plane which contains a line (X axis) corresponding to the front end of the vehicle 10 and extends in a direction perpendicular to the direction of running of the vehicle 10), if the X coordinate of the intersection point thereof is represented by XCL, collision occurrence conditions in which the width α of the vehicle 10 is taken into account are given by the following expression (13):

$$-\alpha/2 \leq XCL \leq \alpha/2 \qquad (13)$$

On the other hand, a straight line formed by projecting the approximate straight line LMV on an X-Z plane is given by the following equation (14):

$$Z - Zv(0) = \frac{Zv(N-1) - Zv(0)}{Xv(N-1) - Xv(0)} \times (X - Xv(0)) \qquad (14)$$

When Z=0, X=XCL are substituted into this equation to calculate XCL, the following equation (15) is obtained:

$$XCL = \frac{Xv(0)/Zv(0) - Xv(N-1)/Zv(N-1)}{1/Zv(0) - 1/Zv(N-1)} \qquad (15)$$

Further, since the real space coordinate X and the coordinate xc on the image have a relationship shown by the above equation (3), the following equations (16) and (17) hold:

$$Xv(0) = xc(0) \times Zv(0)/f \qquad (16)$$
$$Xv(N-1) = xc(N-1) \times Zv(N-1)/f \qquad (17)$$

When the above equations (16) and (17) are applied to the equation (15), the X coordinate XCL of the intersection point is given by the following equation (18):

$$XCL = \frac{xc(0)/f - xc(N-1)/f}{1/Zv(0) - 1/Zv(N-1)} \qquad (18)$$

By substituting the XCL into the expression (13), the conditions defined by the above expression (12) are obtained.

Referring again to FIG. 4, when it is determined at step 43 that there is a high probability of collision, the program proceeds to step S44, whereas when it is determined that there is not a high probability of collision, the warning determination process is terminated.

At step S44, a warning output determination process is carried out, for determining whether or not a warning should be issued. First, it is determined from an output signal from the brake sensor whether or not the driver is carrying out braking operation; i.e, operating the brake of the vehicle 10. If he is not operating the brake, the program immediately proceeds to step S45 to issue a warning. If he is operating the brake, deceleration Gs generated by the braking operation is calculated (as a positive value). When the deceleration Gs is equal to or smaller than a predetermined threshold GTH, the program proceeds to step S45, whereas when Gs>GTH holds, it is determined that collision can be avoided by the braking operation, followed by terminating the warning determination process. This makes it possible to substantially prevent the driver from being warned when he is carrying out an appropriate braking operation, thereby preventing the driver from being annoyed by unnecessary warnings.

The predetermined threshold GTH is set according to the following equation (19):

$$GTH = \frac{Vs^2}{2 \times Zv(0)} \qquad (19)$$

The threshold thus determined corresponds to a condition for stopping the vehicle 10 at a distance of travel equal to or smaller than the distance Zv(0), assuming that the deceleration Gs generated by the braking operation is maintained.

At step S45, a voice alarm is generated by the speaker 3, and as shown in FIG. 21B, an image obtained e.g. by the camera 1R is displayed on the screen 4a of the HUD 4 such that a closing object is emphatically displayed (for instance, enclosed in a frame for emphasis). FIG. 21A shows a state where the screen 4a is not displayed, while FIG. 21B shows a state where the screen 4a is displayed. This enables the driver to positively recognize an object having a high probability of collision against the vehicle 10.

As described above, in the present embodiment, the probability of collision is determined on condition that the expressions (10a) and (10b) are satisfied, and the warning is issued according to the position and the relative movement vector of the object. Therefore, even if a detection error of the relative speed is comparatively large, the probability of collision is accurately determined, and the warning can be issued at a desired timing. Further, other vehicles that are running in the opposite lane or running ahead in the same lane are excluded from the objects of warning, by the condition of the expression (10a). Accordingly, frequent unnecessary warnings can be substantially prevented.

Further, positions of an identical object in the real space are calculated based on a plurality of time series items of position data of the object, and the movement vector of the object is obtained based on its positions in the real space. Then, the probability of collision between the object and the automotive vehicle 10 is determined based on the movement vector thus calculated. Therefore, using the system hereof, differently from the conventional system, it is possible to substantially prevent the occurrence of an erroneous determination, and thereby enhance accuracy of determination of the probability of collision.

Further, the approximate straight line LMV approximating the locus of relative movement of an object to the automotive vehicle 10 is calculated, and the position coordinates of the object are corrected such that positions of the detected object are on the approximate straight line, and the movement vector of the object is obtained based on the corrected position coordinates. This makes it possible to reduce adverse influence of errors in detecting the positions of the object, and to more accurately determine the probability of collision.

Further, since determination of a potential collision is carried out by taking the width α of the vehicle 10 into account, it is possible to more accurately determine the probability of collision and prevent the driver from being unnecessarily warned.

In the present embodiment, the image-processing unit 2 constitutes distance calculating means, relative speed calculating means, relative position-detecting means, movement vector-calculating means, determining means, and part of warning means. More specifically, steps S31 to S33 in FIG. 3 correspond to the distance calculating means. The calculation of the equation (9) corresponds to the relative speed calculating means. Steps S14 to S19 in FIG. 3 correspond to the relative position-detecting means. Steps S20 to S23 in the figure correspond to the movement vector-calculating means. Step S41 to S44 in FIG. 4 correspond to the determining means. Step S45 in FIG. 4 and the speaker 3 and the HUD 4 correspond to the warning means.

Further, the image-processing unit 2 constitutes a distance calculating module, a relative speed calculating module, a relative position-detecting module, a movement vector-calculating module, a probability determining module, and part of a warning module. More specifically, steps S31 to S33 in FIG. 3 correspond to the distance calculating module. The calculation of the equation (9) corresponds to the relative speed calculating module. Steps S14 to S19 in FIG. 3 correspond to the relative position-detecting module. Steps S20 to S23 in the figure correspond to the movement vector-calculating module. Step S41 to S44 in FIG. 4 correspond to the probability determining module. Step S45 in FIG. 4 and the speaker 3 and the HUD 4 correspond to the warning module.

It should be noted that the invention is not limited to the above embodiment, but various variations and modifications are possible. For instance, although in the present embodiment, infrared cameras are used as imaging means, this is not limitative, but TV cameras capable of detecting only normal visible rays, as disclosed in Japanese Laid-Open Patent Publication (Kokai) No. 9-226490, may be employed. By using infrared cameras, however, the extraction process for extracting an animal or a running vehicle can be simplified, and the system can be realized by using an arithmetic unit having relatively low performance.

Further, although in the above embodiment, an example which monitors a front portion of the environment of an automotive vehicle is shown, this is not limitative, but the system may be configured such that any portions of the environment in any directions, including a rear portion thereof, can be monitored.

It is further understood by those skilled in the art that the foregoing is a preferred embodiment of the invention, and that various changes and modifications may be made without departing from the spirit and scope thereof. The scope of the invention is indicated by the appended claims.

What is claimed is:

1. A vehicle environment monitoring system for monitoring an external environment proximate to a vehicle, and for detect an object existing in the external environment of said vehicle from an image obtained by imaging means mounted on said vehicle, the vehicle environment monitoring system comprising:

vehicle speed detecting means for detecting a running speed of said vehicle;

distance calculating means for calculating a distance between said abject and said vehicle based on the image obtained by said imaging means;

relative speed calculating means for calculating a relative speed between said object and said vehicle according to the distance calculated by said distance calculating means; and probability determining means for determining whether or not there is a significant probability that said vehicle will collide with said object, based on the running speed of said vehicle and the distance calculated by said distance calculating means, on condition that an absolute value of a difference between the relative speed and the running speed of said vehicle is less than or equal to half of the running speed of said vehicle.

2. A vehicle environment monitoring system according to claim 1, wherein said probability determining means carries out the determination by applying collision determination conditions that are dependent on a width of said vehicle.

3. A vehicle environment monitoring system according to claim 1, wherein said imaging means comprises two infrared cameras adapted to receive and detect infrared rays.

4. A vehicle environment monitoring system according to claim 1, wherein said imaging means comprises two TV cameras for detecting infrared rays or visible rays, and wherein said relative position-detecting means includes search area-setting means for setting, based on a position of an object image contained in an image output from one of said two TV cameras, a search area within an image output from the other of said two TV cameras for searching for a corresponding object image contained in the image output from the other of said two TV cameras; and corresponding object image-identifying means for identifying the corresponding object image by carrying out a correlation operation on data within said search area, said distance-calculating means calculating the distance between said vehicle and said object based on a parallax between the object image and the corresponding object image.

5. A vehicle environment monitoring system according to claim 1, further comprising warning means for warning a driver of said vehicle, when said probability determining means determines that the probability of collision against said object is high, wherein said warning means is inhibited from warning the driver when the driver is carrying out a braking operation and at the same time deceleration caused by the braking operation is larger than a predetermined threshold.

6. A vehicle environment monitoring system according to claim 1, further comprising relative position-detecting means for detecting a relative position of said object to said vehicle, based on the image obtained by said imaging means and the distance calculated by said distance calculating means, to thereby obtain position data; and movement vector-calculating means for calculating positions of said object in a real space based on a plurality of time series items of the position data detected on said object by said relative position-detecting means, and calculating a movement vector of said object based an the positions in said real space;

wherein said probability determining means determines whether or not the probability of collision is high based on the movement vector, when it is determined based on the running speed of said vehicle and the distance that there is a probability of collision.

7. A vehicle environment monitoring system according to claim 6, wherein said movement vector-calculating means includes approximate straight line-calculating means for calculating an approximate straight line approximating a locus of relative movement of said object, and position data-correcting means for correcting the time series items of the position data by using the approximate straight line, said movement vector-calculating means calculating the movement vector based on the corrected time series items of the position data.

8. A vehicle environment monitoring system according to claim 7, wherein said approximate straight line-calculating means calculates the approximate straight line as a three-dimensional straight line including data of a height of said object.

9. A vehicle environment monitoring method for monitoring an external environment proximate to a vehicle, in which an object existing in the external environment of said vehicle is detected from an image obtained by an imaging device mounted on said vehicle, said method comprising the steps of:

a) detecting a running speed of said vehicle;

b) calculating a distance between said object and said vehicle based on the image obtained by said imaging device;

c) calculating a relative speed between said object and said vehicle according to the calculated distance; and d) determining whether or not there is a significant probability that said vehicle will collide with said object, based on the running speed of said vehicle and the calculated distance, on condition that an absolute value of a difference between the relative speed and the running speed of said vehicle is less than or equal to half of the running speed of said vehicle.

10. A vehicle environment monitoring method according to claim 9, wherein the probability determination is carried out by applying collision determination conditions that are dependent on a width of said vehicle.

11. A vehicle environment monitoring method according to claim 9, wherein said imaging device comprises two infrared cameras adapted to receive and detect infrared rays.

12. A vehicle environment monitoring method according to claim 9, wherein said imaging device comprises two TV cameras for detecting infrared rays or visible rays, and said step of detecting a relative position of said object to said vehicle includes the steps of:

l) setting, based on a position of an object image contained in an image output from one of said two TV cameras, a search area within an image output from the other of said two TV cameras for searching for a corresponding object image contained in the image output from the other of said two TV cameras; and m) identifying the corresponding object image by carrying out a correlation operation on data within said search area, the distance between said vehicle and said object being calculated based on a parallax between the object image and the corresponding object image.

13. A vehicle environment monitoring method according to claim 9, further comprising the step of warning a driver of said vehicle, when said determining step establishes that the probability of collision against said object is high, wherein the step of warning is omitted when the driver is carrying out a braking operation and at the same time deceleration caused by the braking operation is larger than a predetermined threshold.

14. A vehicle environment monitoring method according to claim 9, further comprising the steps of e) detecting a relative position of said object to said vehicle based on the image obtained by said imaging device and the calculated distance, to thereby obtain position data;

f) calculating positions of said object in a real space based on a plurality of time series items of the position data detected on said object;

g) calculating a movement vector of said object based on the positions in said real space; and h) determining whether or not the probability of collision is high based on the movement vector, when it is determined based on the running speed of said vehicle and the distance that there is a probability of collision.

15. A vehicle environment monitoring method according to claim 14, wherein said step of calculating the movement vector includes the steps of:

j) calculating an approximate straight line approximating a locus of relative movement of said object; and k) correcting the time series items of the position data by using the approximate straight line, said movement vector being calculated based on the corrected time series items of the position data.

16. A vehicle environment monitoring method according to claim 15, wherein the approximate straight line is calculated as a three-dimensional straight line including data of a height of said object.

17. A vehicle environment monitoring system for monitoring an external environment proximate to a vehicle, and for detecting an object existing in an environment of said vehicle from an image obtained by an imaging device mounted on said vehicle, the vehicle environment monitoring system comprising:

a vehicle speed sensor for detecting a running speed of said vehicle;

a distance calculating module for calculating a distance between said object and said vehicle based on the image obtained by said imaging device;

a relative speed calculating module for calculating a relative speed between said object and said vehicle according to the distance calculated by said distance calculating module; and a probability determining module for determining whether or not there is a significant probability that said vehicle will collide with said object, based on the running speed of said vehicle and the distance calculated by said distance calculating module, on condition that an absolute value of a difference between the relative speed and the running speed of said vehicle is less than or equal to half of the running speed of said vehicle.

18. A vehicle environment monitoring system according to claim 17, wherein said imaging device comprises two infrared cameras adapted to receive and detect infrared rays.

19. A vehicle environment monitoring system according to claim 17, wherein said imaging device comprises two TV cameras for detecting infrared rays or visible rays, and wherein said relative position-detecting module includes a search area-setting module for setting, based on a position of an object image contained in an image output from one of said two TV cameras, a search area within an image output from the other of said two TV cameras for searching for a corresponding object image contained in the image output from the other of said two TV cameras; and a corresponding object image-identifying module for identifying the corresponding object image by carrying out a correlation operation on data within said search area, said distance-calculating module calculating the distance between said vehicle and said object based on a parallax between the object image and the corresponding object image.

20. A vehicle environment monitoring system according to claim 17, further comprising a warning module for warning a driver of said vehicle, when said probability determining module determines that the probability of collision against said object is high, wherein said warning module is inhibited from warning the driver when the driver is carrying out a braking operation and at the same time deceleration caused by the braking operation is larger than a predetermined threshold.

21. A vehicle environment monitoring system according to claim 17, further comprising a relative position-detecting module for detecting a relative position of said object to said vehicle based on the image obtained by said imaging device and the distance calculated by said distance calculating module, to thereby obtain position data; and a movement vector-calculating module for calculating positions of said object in a real space based on a plurality of time series items of the position data detected on said object by said relative position-detecting module, and calculating a movement vector of said object based on the positions in said real space; wherein said probability determining module determines whether or not the probability of collision is high based on the movement vector, when said probability determining module determines, based on the running speed of said vehicle and the distance, that there is a probability of collision.

22. A vehicle environment monitoring system according to claim 21, wherein said movement vector-calculating module includes approximate straight line-calculating module for calculating an approximate straight line approximating a locus of relative movement of said object, and position data-correcting module for correcting the time series items of the position data by using the approximate straight line, said movement vector-calculating module calculating the movement vector based on the corrected time series items of the position data.

23. A vehicle environment monitoring system according to claim 22, wherein said approximate straight line-calculating module calculates the approximate straight line as a three-dimensional straight line including data of a height of said object.

24. A vehicle environment monitoring system according to claim 17, wherein said probability determining module carries out the determination by applying collision determination conditions that are dependent on a width of said vehicle.

* * * * *

UNITED STATES PATENT AND TRADEMARK OFFICE
CERTIFICATE OF CORRECTION

PATENT NO. : 6,789,015 B2
DATED : September 7, 2004
INVENTOR(S) : Tsuji et al.

It is certified that error appears in the above-identified patent and that said Letters Patent is hereby corrected as shown below:

Column 2,
Line 1, between "thereby giving a" and "to the" change "waning" to -- warning --.
Between lines 22 and 23, at the beginning of the line before "condition that" please insert -- the --

Column 3,
Line 14, between "determined" and "alarms" change "unneccessarily" and -- unnecessary --.

Column 7,
Line 46, between "the angle" and "of turn" change "$\theta$ r" to -- $\theta r$ --.

Column 11,
Line 60, please move "$Zv(0)/VCAR \leqq T$           (10b)" to the next line.

Column 12,
Between lines 10 and 11, at the beginning of the line before "is in the" add -- $V_s$ --.
Between lines 12 and 13, change "words, the object is" to -- words, when the sensed object is --.

Column 16,
Line 19, between "between said" and "and said vehicle", change "abject" to -- object --.

Column 17,
Line 12, at the end of the line directly after "said object based" change "an" to -- on --.

Signed and Sealed this

Twenty-eighth Day of December, 2004

JON W. DUDAS
*Director of the United States Patent and Trademark Office*

UNITED STATES PATENT AND TRADEMARK OFFICE
CERTIFICATE OF CORRECTION

PATENT NO. : 6,789,015 B2  Page 1 of 1
APPLICATION NO. : 10/102572
DATED : September 7, 2004
INVENTOR(S) : Tsuji et al.

It is certified that error appears in the above-identified patent and that said Letters Patent is hereby corrected as shown below:

Column 2,
Line 1, between "thereby giving a" and "to the" change "waning" to -- warning --.
Between lines 22 and 23, at the beginning of the line before "condition that" please insert -- the --.

Column 3,
Line 14, between "determined" and "alarms" change "unnecessarily" and -- unnecessary --.

Column 7,
Line 46, between "the angle" and "of turn" change "θ r" to -- θr --.

Column 11,
Line 60, please move "$Zv(0)/VCAR \leqq T$     (10b)" to the next line.

Column 12,
Between lines 10 and 11, at the beginning of the line before "is in the" add -- $V_s$ --.
Between lines 12 and 13, change "words, the object is" to -- words, when the sensed object is --.

Column 16,
Line 19, between "between said" and "and said vehicle", change "abject" to -- object --.

Column 17,
Line 12, at the end of the line directly after "said object based" change "an" to -- on --.

This certificate supersedes Certificate of Correction issued December 28, 2004.

Signed and Sealed this

Nineteenth Day of September, 2006

JON W. DUDAS
*Director of the United States Patent and Trademark Office*

UNITED STATES PATENT AND TRADEMARK OFFICE
CERTIFICATE OF CORRECTION

PATENT NO. : 6,789,015 B2
APPLICATION NO. : 10/102572
DATED : September 7, 2004
INVENTOR(S) : Tsuji et al.

It is certified that error appears in the above-identified patent and that said Letters Patent is hereby corrected as shown below:

Title page:
In section (56), References Cited, further under "OTHER PUBLICATIONS", before "2003/0139865" insert --U.S. Pre-Grant Publication--;
change "et al" to --et al.--.

Column 1:
Line 12, change "vehicle from an image" to --vehicle, from an image--.
Line 15, change "bear or the like" to --bear, or the like--.

Column 2:
Line 1, change "waning" to --warning--.
Line 32, change "in other word" to --in other words--.

Column 3:
Line 15, change "unnecessarily alarms" to --unnecessary alarms--.

Column 5:
Line 48, change "memory is data of" to --memory are data of--.
Line 66, change "image is binarized" to --image are binarized--.

Column 6:
Line 8, change "image data is" to --image data are--.
Line 20, change "length data represents" to --length data represent--.
Line 43, change "G is calculated" to --G are calculated--.
Line 59, change "their identity" to --their identities--.

Column 8:
Line 12, change "is available" to --are available--.

This certificate supersedes the Certificates of Correction issued December 28, 2004 and September 19, 2006.

Signed and Sealed this

Twentieth Day of July, 2010

David J. Kappos
*Director of the United States Patent and Trademark Office*

CERTIFICATE OF CORRECTION (continued)
U.S. Pat. No. 6,789,015 B2

Column 8 (continued):
    Line 32, change "R1 as shown" to --R1, as shown--.
    Line 33, change "11B are extracted" to --11B, are extracted--.
    Line 60, change "of a mid" to --of a mid- --.
    Line 66, change "system is defined" to --system are defined--.

Column 9:
    Line 37, change "is stored in the" to --are stored in the--.

Column 10:
    Line 15, change "series of real space" to --a series of real space--.
    Line 44, after "Z(j)–Zav)" insert a --,--.
    Line 46, after "respective data points" insert a --,--.
    Line 47, after "a direction vector L" insert a --,--.
    Line 52 (in equation (6)), change "1x" to --lx--;
        change "1y" to --ly--;
        change "1z" to --lz--
(in summary, change all three instances of the number "1" (one) to the letter --l-- (un-capitalized "el")).

Column 11:
    Line 21, change "Xv(N–1," to --(Xv(N–1),--;
        after "Zv(N–1)" insert --)--.
    Line 50, change "(10a), (10b)," to --(10a), (10b),--.
    Line 53, change "(10a), (10b)," to --(10a), (10b),--.
    Line 60 (equation (10b)), make into two separate lines:
        --(|VCAR–Vs |≦VCAR/2)--
    and    --Zv(0)/VCAR≦T--.

Column 12:
    Line 10, after "when the relative speed" insert --Vs--.
    Line 11, delete "or is at least a".
    Line 12, delete "predetermined percentage of the running speed of the".
    Line 13, change "vehicle, in other words, the object" to --, in other words, when the sensed object--;
    Line 22, change "both detected or calculated" to --, detected and/or calculated,--;
        change "an hatched" to --a hatched--.
    Line 46, change "opposite sides" to --each side--.

Column 13:
    Line 22, change "braking operation; i.e.," to --braking operation, i.e.,--.

Column 14:
    Line 13, change "at step 43" to --at step S43--.

Column 15:
    Line 37, change "Step S41 to S44" to --Steps S41 to S44--.
    Line 50, change "Step S41 to S44" to --Steps S41 to S44--.
    Line 65, after "embodiment" delete the ",".

Column 16:
    Line 12, change "detect an object" to --detecting an object--.
    Line 19, change "between said abject" to --between said object--.

Column 17:
    Line 12, change "object based an" to --object based on--.

Column 19:
    Line 28, after "driver of said vehicle" delete the ",".

Column 20:
    Line 18, change "includes approximate" to --includes an approximate--.
    Line 20, change "and position" to --and a position--.